March 10, 1942. B. D. McINTYRE ET AL 2,275,637
COMBINED STABILIZER AND STRUT CONSTRUCTION
Filed Feb. 14, 1940

INVENTORS
BROUWER D. McINTYRE
JOHN M. NICKELSEN
ARTHUR BOOR
BY
ATTORNEYS

Patented Mar. 10, 1942

2,275,637

UNITED STATES PATENT OFFICE 2,275,637

COMBINED STABILIZER AND STRUT CONSTRUCTION

Brouwer D. McIntyre, Monroe, and John M. Nickelsen, Ann Arbor, Mich., and Arthur Boor, Toledo, Ohio, assignors to Monroe Auto Equipment Company, Monroe, Mich., a corporation of Michigan Application February 14, 1940, Serial No. 318,950

5 Claims. (Cl. 267—11)

This invention relates generally to stabilizing equipment for motor vehicles and refers more particularly to stabilizers of the type having a torsion bar mounted on either the sprung or unsprung assembly of the vehicle for rocking movement and having arms projecting laterally from the bar connected to the other assembly to resist relative deflection of the suspension springs at opposite sides of the vehicle and maintain the normal plane of the body of the vehicle substantially parallel with the plane of the axle when the vehicle is turned in either direction from a straight line course of travel.

Stabilizers of the type set forth above operate satisfactorily to check body roll but are of little or of no value in preventing the objectionable lateral shifting movement of the sprung assembly relative to the unsprung assembly. The degree of lateral shifting movement of the sprung assembly is more or less critical with different types of suspension systems and, even though slight, results in imparting objectionable sensations to the occupants of the vehicle body. Therefore, many manufacturers have found it necessary to supplement the stabilizer with a transverse strut which connects the sprung assembly to the unsprung assembly in a manner to positively hold the sprung assembly in fixed relation to the unsprung assembly insofar as lateral movement therebetween is concerned.

The present invention contemplates eliminating the objectionable lateral shifting movement of the sprung assembly without the necessity of going to the expense of incorporating a strut by providing a stabilizer unit having means for resisting endwise displacement of the torsion bar forming a part of the stabilizer. Inasmuch as the torsion bar is mounted on one of the assemblies and is directly connected to the other assembly, it necessarily follows that the same acts as a strut and resists any tendency for one assembly to shift laterally relative to the other assembly.

A further object of this invention resides in the novel means provided for mounting the stabilizer on the vehicle and this feature, as well as the foregoing and other objects, will be made more apparent as this description proceeds, especially when considered in connection with the accompanying drawing, wherein.

Figure 1:
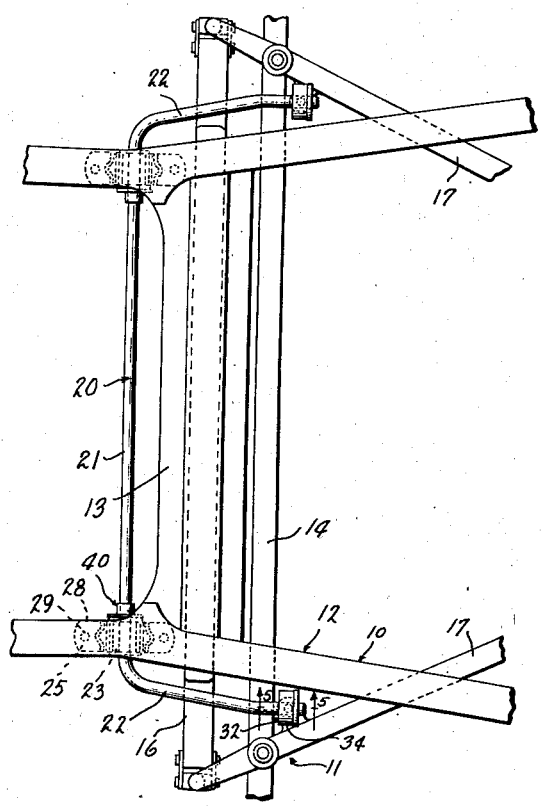
Figure 1 is a semi-diagrammatic plan view of a part of a motor vehicle equipped with a combined stabilizer and strut constructed in accordance with this invention.

Referring now more in detail to the drawing, it will be noted that there is illustrated in Figure 1 a portion of a vehicle having a sprung assembly 10 and having an unsprung assembly 11. In the present instance, the sprung assembly comprises a frame 12 having laterally spaced longitudinally extending side sills secured together in accordance with conventional practice by means of a suitable cross brace 13.

The unsprung assembly 11 comprises an axle 14 extending transversely of the frame 12 beneath the same and adapted to carry the usual road engaging wheels (not shown) at opposite ends thereof. Although various different types of suspension springs may be employed for supporting the sprung assembly 10 from the unsprung assembly 11, nevertheless, for the purpose of illustration, I have shown a well-known suspension system comprising briefly a transverse leaf spring 16 secured intermediate the ends of the sprung weight and having means at the opposite ends connected to the axle. In suspension systems of the above type, it is customary to further support the axle by means of radius rods and the latter are designated generally in the drawing by the reference character 17.

In vehicles equipped with the general construction outlined above, the sprung assembly tends to roll relative to the unsprung assembly when the vehicle is turned in either direction from a straight line course of travel. In accordance with the present invention, "side sway" or "roll" of the sprung assembly of the vehicle is minimized by a torsion stabilizer 20 comprising a substantially U-shaped spring steel bar having a transverse section 21 extending across the vehicle and having arms 22 extending substantially longitudinally of the vehicle. In the present instance, the transverse section 21 of the torsion bar is mounted upon the sprung assembly 10 and the free ends of the arms 22 are connected to the unsprung assembly 11. In some instances, however, it is more convenient or desirable to support the transverse section 21 of the bar on the unsprung assembly and to connect the free ends of the arms 22 to the sprung assembly. It is to be understood, therefore, that either installation is contemplated by the present invention.

Referring now more in detail to the particular installation selected for the purpose of installing the present invention, it will be noted from the several figures of the drawing that the section 21 of the U-shaped torsion bar extends transversely of the frame 12 beneath the latter and the opposite ends of the section 21 are respectively mounted upon the side sills of the frame for rocking movement. The mountings for the torsion bar on the frame 12 are identical and, accordingly, a description of one of the mountings will suffice for both. Upon reference to Figures 3 and 4, it will be noted that each mounting comprises a block 23 of resilient material, such as rubber, having a bore 24 therethrough for receiving the transverse section 21 of the torsion bar. The block 23 is secured under compression against the torsion bar by means of a bracket 25 and the arrangement is such that rocking movement of the torsion bar relative to the mountings is resisted or damped to some extent by the rubber blocks. In some instances, it may be desirable to vulcanize or otherwise unite the rubber blocks 23 to the torsion bar and, in case this procedure is followed, rocking movement of the torsion bar relative to the mountings is permitted solely by the interparticle flow of the rubber or similar resilient material from which the blocks are formed.

Figure 3:
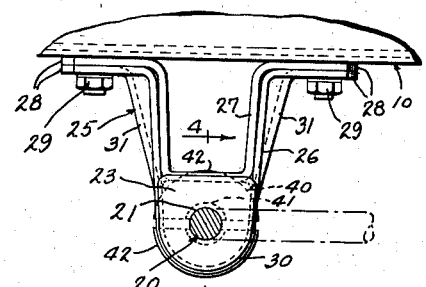
Figure 3 is an enlarged elevational view of a part of the construction shown in Figure 2.
Figure 4:
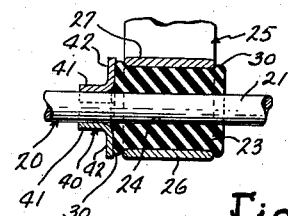
Figure 4 is a sectional view taken substantially on the plane indicated by the line 4—4 of Figure 3.
Figure 5:
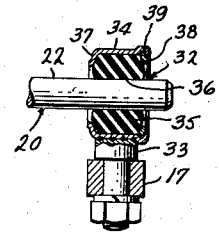
Figure 5 is an enlarged sectional view taken substantially on the plane indicated by the line 5—5 of Figure 1.
Figure 2:
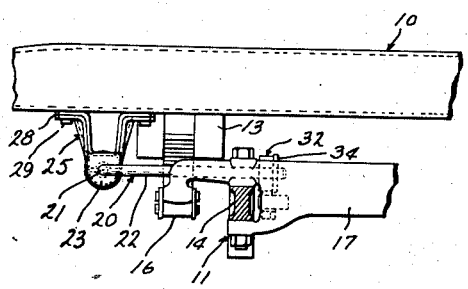
Figure 2 is a side elevational view, partly in section, of the construction shown in Figure 1.

As shown in Figure 3, each bracket 25 comprises a pair of cooperating substantially U-shaped members 26 and 27. The U-shaped member 27 nests within the U-shaped member 26 and both members are provided with attaching flanges 28 at the upper ends to provide for securing the bracket to the underside of the frame by means of the clamping bolts 29. The block of rubber material 23 previously referred to is supported in the outer U-shaped member 26 between the base portion of the latter and the base portion of the inner U-shaped member 27. The relative dimensions of the block 23 and U-shaped members of the bracket are such that when the latter members are secured in assembled relationship to the frame, they cooperate to secure the rubber block 23 under compression against the torsion bar. Also, as a result of the pressure applied to the block 23 by the cooperating sections of the bracket, the opposite ends of the block extend beyond opposite sides of the bracket and form enlargements 30 which serve as resilient bumpers for any instrumentalities that may either be positioned or extend adjacent to the mounting. Attention is also called to the fact at this time that the opposite sides of the outer U-shaped bracket may be fashioned to form reinforcing ribs 31, if desired, to prevent separation of these sides under the action of the pressure applied to the block 23.

The free ends of the arms 22 are connected to the unsprung assembly by means of mountings 32. In the specific embodiment of the invention selected for the purpose of illustration, the free ends of the arms 22 are connected to the radius rods 17, although practically any other part of the unsprung assembly is suitable for this purpose. Each mounting 32 is provided with a bracket 33 having provision for attachment to the adjacent radius rod and also having a housing 34 open at both ends to provide for extending the free end of the adjacent arm 22 therethrough. In addition, the housing 34 contains a block 35 of resilient material, such as rubber, having a bore 36 therethrough for receiving the free end of the arm 22 and adapted to be held under compression against the arm 22 by the housing 34. Axial displacement of the block 35 in one direction relative to the housing is prevented by means of a flange 37 extending inwardly from one end of the housing and displacement in the opposite direction is prevented by means of a locking ring 38 secured in a recess 39 formed in the opposite end of the housing.

If desired, the block 35 may be vulcanized or otherwise united to the end of the arm 22 and, in the event this procedure is followed, shifting movement of the arms 22 relative to the brackets 33 is permitted solely by the interparticle flow of the rubber or resilient material from which the blocks 35 are formed. In any case, the blocks 35 cooperate with the blocks 23 to permit limited shifting movement of the torsion bar fore and aft of the vehicle. This movement is desirable in that it compensates for the different paths of travel of the free ends of the arms 22 and the axle or radius rods 17 when the spring 16 is deflected. In addition, it will be noted that the mountings are not only quiet in operation and require no lubrication, but also perform a limited damping action on the torsion bar to control to some extent spring deflection.

While the construction described above is highly efficient in stabilizing the sprung weight of the vehicle against roll when the path of travel of the vehicle is changed, for example, nevertheless, the sprung weight may still shift laterally relative to the unsprung weight. Such shifting movement imparts objectionable sensations to the occupants of the vehicle and in many installations in the past has been overcome by providing a separate strut interconnecting the sprung and unsprung assemblies of the vehicle. According to the present invention, this objectionable lateral shifting of one assembly relative to the other is overcome without the necessity of providing a separate strut and is accomplished by a relatively simple addition to the torsion bar previously described. In detail, an abutment 40 is secured to the transverse section 21 of the torsion bar at the inner side of each bracket 25 so that the enlargements 30 at the inner ends of the blocks 23 are engaged by the abutments. As a result, endwise displacement of the torsion bar relative to the sprung weight is prevented and since the free ends of the arms 22 are secured to the unsprung weight, it follows that the torsion bar acts as a strut to prevent lateral shifting movement of one assembly relative to the other. Upon reference to Figure 4, it will be noted that each abutment is formed of complementary sections for convenience in assembly. The sections of each abutment are formed with axially extending hub portions 41 adapted to be welded or otherwise permanently secured to opposite sides of the torsion bar and are also formed with radially outwardly extending flanges 42 adapted to abut the inner end of the adjacent mounting block 23. In this connection, it is important to note that the abutments are secured in place prior to clamping the blocks 23 in the brackets 25, with the result that the blocks 23 are also compressed against the abutments when the cooperating parts of the brackets are secured in clamping engagement with the blocks 23.

Figure 6:
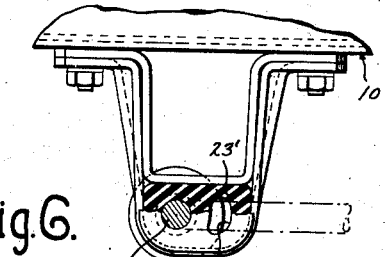
Figure 6 is a sectional view of a slightly modified form of construction.

The embodiment of the invention shown in Figure 6 is identical to the modification previously described, with the exception that the blocks 23' of resilient material are of substantially greater width than the blocks 23 and the bore through the blocks for receiving the torsion bar is offset from the axis of the blocks to provide a substantially greater amount of rubber material on the side of the torsion bar facing the free ends of the arms 22. This arrangement is particularly advantageous in instances requiring substantial fore and aft shifting movement of the torsion bar to compensate for relatively large differences in the paths of travel of the free ends of the arms and the axle. In the event a greater degree of movement of the torsion bar is desired, the resiliency of the blocks 23' may be increased by forming openings 45 through the portions of the blocks located on the sides of the torsion bar facing the free ends of the arms 22.

What we claim as our invention is:

1. In a motor vehicle having sprung and unsprung assemblies, a stabilizer for the sprung assembly comprising a torsion bar extending transversely of the vehicle and mounted on one of the assemblies for rocking movement, arms extending laterally from the bar at points spaced longitudinally of the bar and connected to the other assembly, means mounting the torsion bar on the said one assembly including a U-shaped member secured to the latter assembly, a block of resilient material mounted in the U-shaped member and having an opening therethrough for receiving the torsion bar, and a second U-shaped member secured to the said one assembly and extending into the first mentioned U-shaped member, the outer surface of the base of the second U-shaped member abutting the side of the block of resilient material opposite the side engaged by the base of the first U-shaped member and cooperating with the latter to secure the block under compression against said bar.

2. In a motor vehicle having sprung and unsprung assemblies, a stabilizer for the sprung assembly comprising a torsion bar extending transversely of the vehicle and mounted on one of the assemblies for rocking movement, arms extending laterally from the bar at points spaced longitudinally of the bar and connected to the other of the assemblies, abutments extending radially outwardly from the bar in spaced relation axially of said bar, and brackets secured to the said one assembly adjacent opposite ends of the bar, each of said brackets comprising a U-shaped member having a block of rubber material therein provided with an opening therethrough for receiving said bar and having a second U-shaped member extending into the first U-shaped member to cooperate with the latter in securing the block under compression against the bar and against the adjacent abutment.

3. In a motor vehicle having sprung and unsprung assemblies, a stabilizer for the sprung assembly comprising a torsion bar extending transversely of the vehicle and mounted on one of the assemblies for rocking movement, arms extending laterally from the torsion bar at points spaced longitudinally of said bar and connected to the other assembly, a block of resilient material adjacent each end of the bar and having an opening therethrough for receiving said bar, a pair of brackets respectively securing the resilient blocks to the said one assembly, each bracket comprising a U-shaped member having the free ends of the leg portions secured to said one assembly and adapted to receive one of the blocks between the leg portions, a second U-shaped member having the free ends of the leg portions secured to the said one assembly and extending into the first named U-shaped member, said second U-shaped member having a substantially flat base portion engageable with the adjacent side of the resilient block in the first named U-shaped member and cooperating with the base portion of the latter member to secure the block under compression against the torsion bar.

4. In a motor vehicle having sprung and unsprung assemblies, a stabilizer for the sprung assembly comprising a torsion bar extending transversely of the vehicle and mounted on one of the assemblies for rocking movement, arms extending laterally from the bar at points spaced longitudinally of said bar and connected to the other assembly, a block of resilient material adjacent each end of the bar and having an opening therethrough for receiving said bar, the openings through the resilient blocks for receiving the torsion bar being offset from the geometrical centers of the blocks to provide a substantially greater mass of resilient material at one side of the torsion bar and thereby permit lateral shifting movement of the bar relative to the said one assembly.

5. In a motor vehicle having sprung and unsprung assemblies, a stabilizer for the sprung assembly comprising a torsion bar extending transversely of the vehicle and mounted on one of the assemblies for rocking movement, arms extending laterally from the bar at points spaced longitudinally of said bar and connected to the other assembly, a block of resilient material adjacent each end of the bar and having an opening therethrough for receiving said bar, a clamp for securing each of the blocks to the said other assembly, the openings through the resilient blocks for receiving the torsion bar being offset from the geometric centers of the blocks to provide a substantially greater mass of resilient material at one side of the bar and each of the blocks having a recess in the portions of greater mass to permit lateral shifting movement of the torsion bar relative to said clamp.

BROUWER D. McINTYRE.
JOHN M. NICKELSEN.
ARTHUR BOOR.